US012572990B2

(12) United States Patent
Shao et al.

(10) Patent No.: US 12,572,990 B2
(45) Date of Patent: Mar. 10, 2026

(54) METHODS AND IoT SYSTEMS FOR MONITORING WELDING OF SMART GAS PIPELINE BASED ON GOVERNMENT SUPERVISION

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Bin Liu, Chengdu (CN); Siwei Zeng, Chengdu (CN); Yunsong Gu, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 19/086,106

(22) Filed: Mar. 20, 2025

(65) Prior Publication Data

US 2025/0217906 A1     Jul. 3, 2025

(30) Foreign Application Priority Data

Dec. 23, 2024     (CN) ......................... 202411899826.6

(51) Int. Cl.
| | |
|---|---|
| *G06Q 50/08* | (2012.01) |
| *G06Q 10/0635* | (2023.01) |
| *G06Q 50/26* | (2024.01) |

(52) U.S. Cl.
CPC ......... *G06Q 50/08* (2013.01); *G06Q 10/0635* (2013.01); *G06Q 50/26* (2013.01)

(58) Field of Classification Search
CPC ..... G06Q 50/08; G06Q 50/26; G06Q 10/0635
See application file for complete search history.

(56) References Cited

U.S. PATENT DOCUMENTS

| | | | |
|---|---|---|---|
| 8,484,066 B2 * | 7/2013 | Miller | .................... G06Q 10/08 |
| | | | 726/23 |
| 2011/0198316 A1 * | 8/2011 | Legori | .............. B23K 37/0531 |
| | | | 219/61.1 |

(Continued)

FOREIGN PATENT DOCUMENTS

| | | |
|---|---|---|
| CN | 106003697 B | 12/2017 |
| CN | 111136411 B | 8/2021 |

(Continued)

OTHER PUBLICATIONS

Nasser et al. "Mitigation of Risks Associated with Gas Pipeline Failure by Using Quantitative Risk Management Approach: A Descriptive Study on Gas Industry" (2021) (https://www.mdpi.com/2077-1312/9/10/1098) (Year: 2021).*

(Continued)

*Primary Examiner* — Sujay Koneru
(74) *Attorney, Agent, or Firm* — METIS IP LLC

(57) ABSTRACT

Embodiments of the present disclosure provide a method and an Internet of Things (IoT) system for monitoring welding of a smart gas pipeline based on government supervision, the system comprising a smart gas government safety supervision platform, a smart gas government safety supervision sensing network platform, a smart gas government safety supervision object platform, a gas company sensing network platform, and a gas construction object platform. The method is performed based on the gas company management platform, comprising: obtaining at least one set of welding point information and corresponding pipeline construction information in a preset pipeline region; determining a first welding risk based on the pipeline construction information; and determining a first risk value based on the first welding risk and a historical welding risk; in response to determining that the first risk value meets a preset condition, generating a welding adjustment instruc- (Continued)

100 tion; obtaining welding process information uploaded by a welding personnel terminal; performing a preset processing on the welding process information to obtain welding key information; obtaining monitoring parameters of the preset pipeline region.

10 Claims, 5 Drawing Sheets

(56) References Cited

U.S. PATENT DOCUMENTS

| | | | | |
|---|---|---|---|---|
| 2013/0006701 A1 * | 1/2013 | Guven | .............. | G06Q 10/0635 |
| | | | | 705/7.28 |
| 2018/0284758 A1 * | 10/2018 | Cella | ....................... | H02M 1/12 |
| 2020/0191316 A1 * | 6/2020 | Du | ..................... | G06Q 10/0635 |
| 2022/0146018 A1 * | 5/2022 | Fernandes | .............. | F16L 1/038 |
| 2023/0367298 A1 * | 11/2023 | Shao | ....................... | G16Y 20/10 |
| 2024/0310006 A1 | 9/2024 | Shao et al. | | |

FOREIGN PATENT DOCUMENTS

| | | | | |
|---|---|---|---|---|
| CN | 217316736 U | 8/2022 | | |
| CN | 107420743 B | 6/2023 | | |
| CN | 117252369 A | 12/2023 | | |
| CN | 118890174 A | 11/2024 | | |
| DE | 202024103902 U1 * | 7/2024 | ............. | G06Q 50/08 |

OTHER PUBLICATIONS

Notification to Grant Patent Right for Invention in Chinese Application No. 202411899826.6 mailed on Mar. 26, 2025, 5 pages.
First Office Action in Chinese Application No. 202411899826.6 mailed on Feb. 25, 2025, 12 pages.
First Office Action in Chinese Application No. 202411899826.6 mailed on Feb. 25, 2025, 14 pages.
Kang, Zhen, Design of online intelligent monitoring system for PE pipeline welding Quality, Wanfang Data, 2022, 77 pages.
Li, Mingfei et al., Study on Quantitative Risk Assessment of Girth Weld Failure of Natural Gas Pipeline Based on Reliability, The 12th International Conference on Quality, Reliability, Risk, Maintenance, and Safety Engineering (QR2MSE 2022), 225-232, 2022.

* cited by examiner

<u>100</u>

200

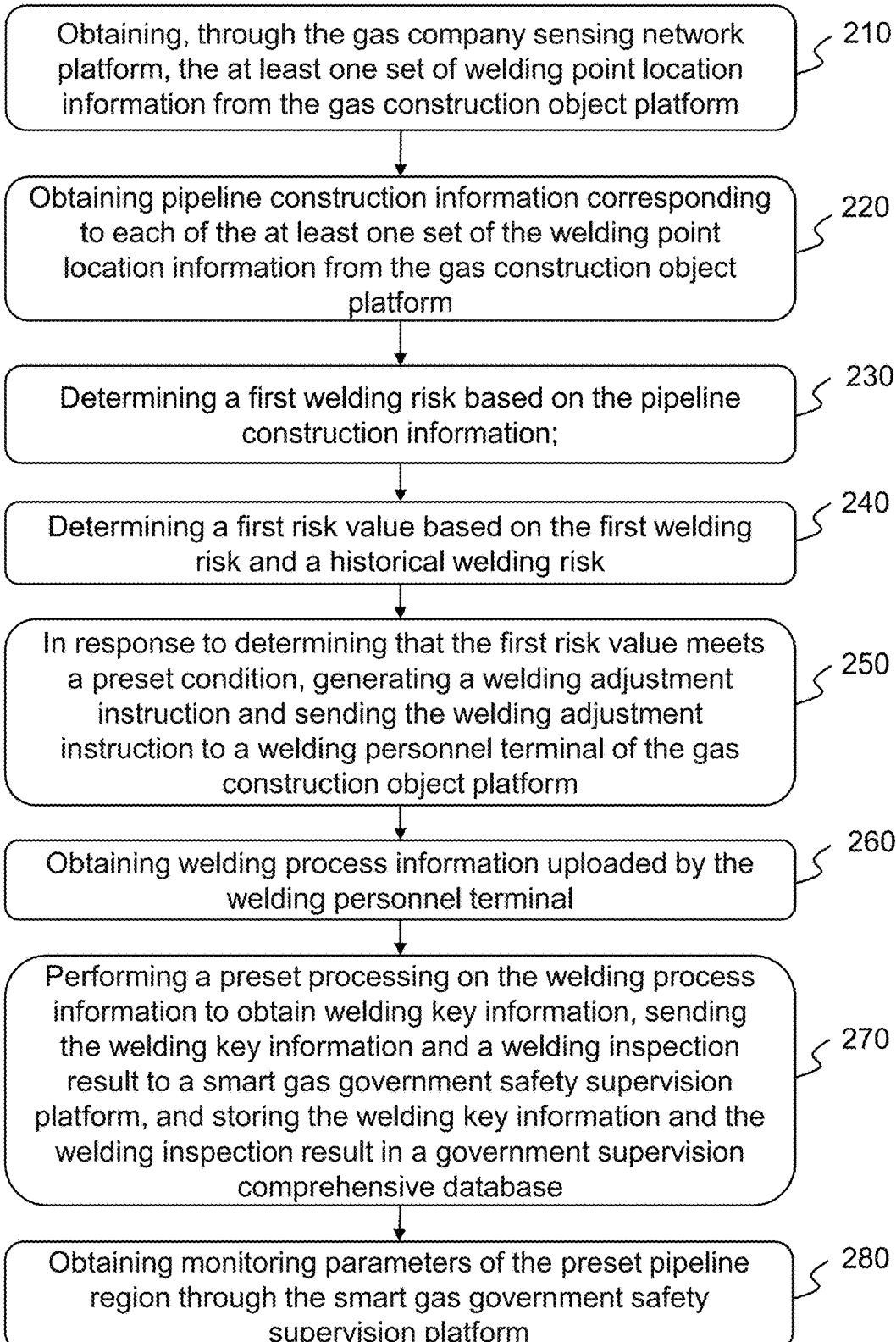

Obtaining, through the gas company sensing network platform, the at least one set of welding point location information from the gas construction object platform ⟋ 210

Obtaining pipeline construction information corresponding to each of the at least one set of the welding point location information from the gas construction object platform ⟋ 220

Determining a first welding risk based on the pipeline construction information; ⟋ 230

Determining a first risk value based on the first welding risk and a historical welding risk ⟋ 240

In response to determining that the first risk value meets a preset condition, generating a welding adjustment instruction and sending the welding adjustment instruction to a welding personnel terminal of the gas construction object platform ⟋ 250

Obtaining welding process information uploaded by the welding personnel terminal ⟋ 260

Performing a preset processing on the welding process information to obtain welding key information, sending the welding key information and a welding inspection result to a smart gas government safety supervision platform, and storing the welding key information and the welding inspection result in a government supervision comprehensive database ⟋ 270

Obtaining monitoring parameters of the preset pipeline region through the smart gas government safety supervision platform ⟋ 280

Obtaining point environmental information of each welding point from the gas construction object platform, generating first environmental information based on environmental information of the preset pipeline region and the point environmental information  ⌒ 310

↓

Assessing a second welding risk of each welding point based on the first environmental information and the pipeline construction information  ⌒ 320

↓

Determining an early warning notification based on the second welding risk and sending the early warning notification to the gas construction object platform  ⌒ 330

METHODS AND IoT SYSTEMS FOR MONITORING WELDING OF SMART GAS PIPELINE BASED ON GOVERNMENT SUPERVISION

CROSS-REFERENCE TO RELATED APPLICATIONS

This application claims priority to Chinese Patent Application No. 202411899826.6, filed on Dec. 23, 2024, the contents of which are incorporated herein by reference.

TECHNICAL FIELD

The present disclosure relates to the technical field of pipeline welding monitoring, and in particular relates to a method and an Internet of Things (IoT) system for monitoring welding of a smart gas pipeline based on government supervision.

BACKGROUND

A gas pipeline system is an important part of urban infrastructure, which is related to safe transmission and efficient distribution of gas. Welding is a commonly used technique for connecting pipe interfaces or repairing defects in the installation and repair of gas piping. Because gas piping systems typically cover a wide region and the environment at the construction site is highly variable, the quality and efficiency of on-site welding is often significantly affected by multiple environmental factors.

A prior art CN107420743B proposes a system and method for gas PE pipeline network measurement and control, which improves the gas pipeline network by setting up a plurality of measurement and control nodes on a pipeline network between a gas source and a user, as well as by remote control via a smart valve, to improve the safety and efficiency of the gas pipeline network. However, the method fails to take into account influence of different environmental factors on the quality of welding.

Therefore, it is desirable to propose a method and an Internet of Things (IoT) system for monitoring welding of a smart gas pipeline based on government supervision, which can be used to monitor the quality of the welding of gas pipeline sites more comprehensively with respect to different environmental factors, in order to improve the safety and efficiency of welding operations.

SUMMARY

One or more embodiments of the present disclosure provide a method for monitoring welding of a smart gas pipeline based on government supervision. The method is executed based on a gas company management platform of an Internet of Things (IoT) system for monitoring welding of a smart gas pipeline based on government supervision. The method comprises: obtaining, through a gas company sensing network platform, at least one set of welding point information from a gas construction object platform, wherein each of the at least one set of welding point information corresponds to at least one welding point in the same preset pipeline region; obtaining pipeline construction information corresponding to each of the at least one set of the welding point information from the gas construction object platform; determining a first welding risk based on the pipeline construction information; determining a first risk value based on the first welding risk and a historical welding risk; in response to determining that the first risk value meets a preset condition, generating a welding adjustment instruction and sending the welding adjustment instruction to a welding personnel terminal of the gas construction object platform; obtaining welding process information uploaded by the welding personnel terminal; performing a preset processing on the welding process information to obtain welding key information, sending the welding key information and a welding inspection result to a smart gas government safety supervision platform, and storing the welding key information and the welding inspection result in a government supervision comprehensive database; obtaining monitoring parameters of the preset pipeline region through the smart gas government safety supervision platform.

One of the embodiments of the present disclosure provides an Internet of Things (IoT) system for monitoring welding of a smart gas pipeline based on governmental regulation, comprising: a smart gas government safety supervision platform, a smart gas government safety supervision sensing network platform, a smart gas government safety supervision object platform, a gas company sensing network platform and a gas construction object platform, wherein the smart gas government safety supervision platform includes a government supervision comprehensive database, and the smart gas government safety supervision object platform includes a gas company management platform. The gas construction object platform is configured to obtain at least one set of welding point information and pipeline construction information corresponding to each of the at least one set of the welding point information; the gas company management platform is configured to: obtain, through the gas company sensing network platform, the at least one set of welding point information from the gas construction object platform, wherein each of the at least one set of welding point information corresponds to at least one welding point in the same preset pipeline region; obtain the pipeline construction information corresponding to each of the at least one set of the welding point information from the gas construction object platform; determine a first welding risk based on the pipeline construction information; determine a first risk value based on the first welding risk and a historical welding risk; in response to determining that the first risk value meets a preset condition, generate a welding adjustment instruction and send the welding adjustment instruction to a welding personnel terminal of the gas construction object platform; obtain welding process information uploaded by the welding personnel terminal; perform a preset processing on the welding process information to obtain welding key information, send the welding key information and a welding inspection result to the smart gas government safety supervision platform, and store the welding key information and the welding inspection result in the government supervision comprehensive database; obtain monitoring parameters of the preset pipeline region through the smart gas government safety supervision platform; the smart gas government safety supervision platform is configured to determine the monitoring parameters of the preset pipeline region.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, wherein:

FIG. 2 is an exemplary flowchart illustrating a method for monitoring welding of a smart gas pipeline based on government supervision according to some embodiments of the present disclosure;

FIG. 3 is an exemplary flowchart illustrating a process for determining an early warning notification according to some embodiments of the present disclosure;

DETAILED DESCRIPTION

Figure 1:
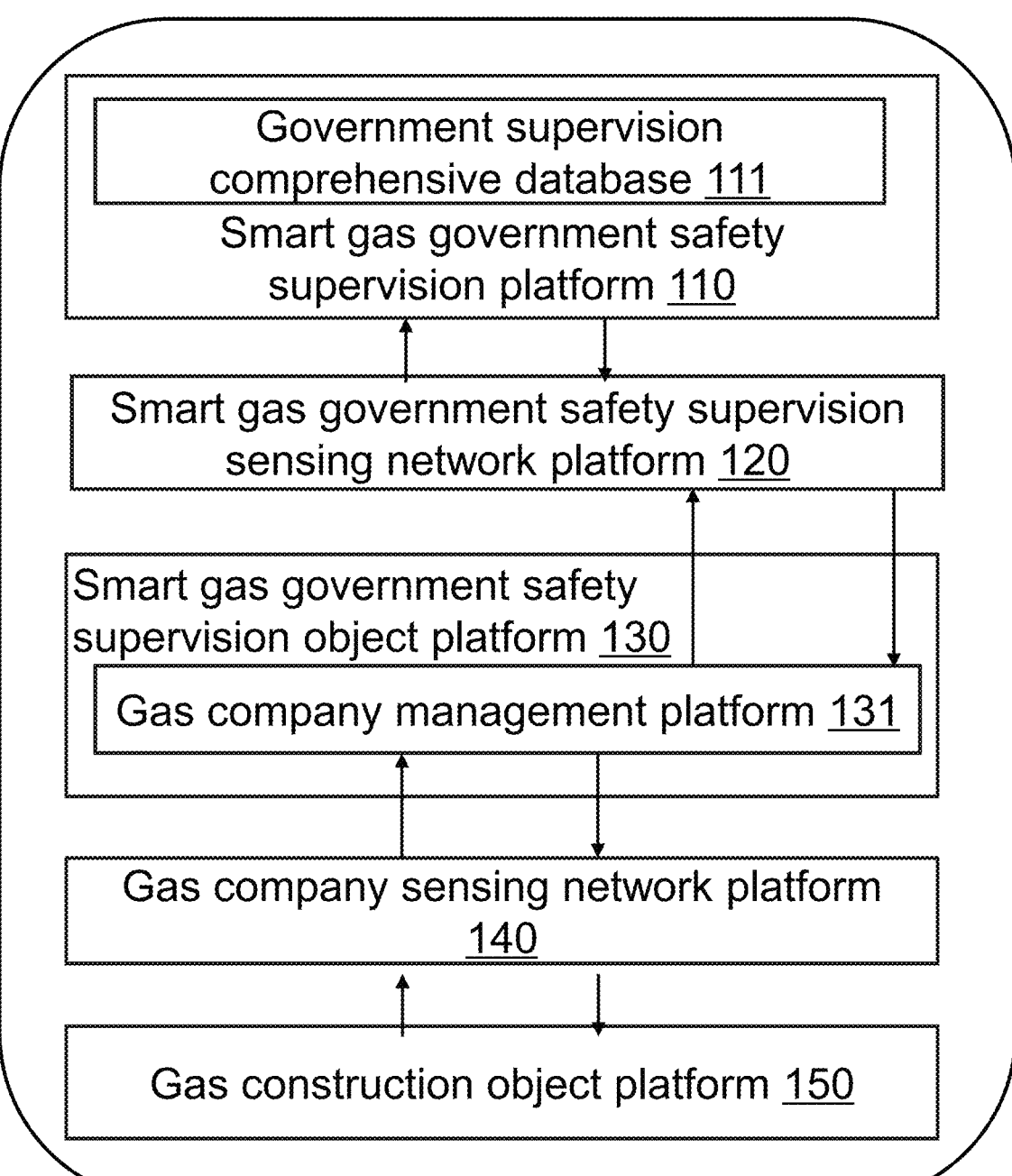
FIG. 1 is a schematic diagram illustrating a platform structure of an Internet of Things (IoT) system for monitoring welding of a smart gas pipeline based on government supervision according to some embodiments of the present disclosure.

In order to more clearly illustrate the technical solutions of the embodiments of the present disclosure, the following will briefly describe the accompanying drawings to be used in the description of the embodiments. Obviously, the accompanying drawings in the following description are only some examples or embodiments of the present disclosure, and it is possible for a person of ordinary skill in the art to apply the present disclosure to other similar scenarios in accordance with the accompanying drawings without creative labor. Unless obviously obtained from the context or the context illustrates otherwise, the same numeral in the drawings refers to the same structure or operation.

It should be understood that as used herein, the terms "system," "device," "unit," and/or "module" are a way to distinguish between different components, elements, parts, sections or assemblies at different levels. However, other words may be replaced by different expressions if they accomplish the same purpose.

As shown in the present disclosure and in the claims, unless the context clearly suggests an exception, the words "one," "a," "an," and/or "the" do not refer specifically to the singular but may also include the plural. Generally, the terms "including" and "comprising" suggest only the inclusion of clearly identified steps and elements. In general, the terms "including" and "comprising" only suggest the inclusion of explicitly identified steps and elements that do not constitute an exclusive list, and the method or apparatus may also include other steps or elements.

Gas pipelines are often reinforced by welding at pipeline interfaces or defects in installation and repair processes; because gas pipelines occupy a large region, different environmental factors may affect different welding locations during actual field welding, impacting welding efficiency and even affecting welding quality.

Therefore, the present disclosure provides a method and an Internet of Things (IoT) system for monitoring welding of a smart gas pipeline based on government supervision, wherein the IoT system monitors pipeline construction information and environmental information for different preset regions, determines risks in the welding process, thereby issuing early warning messages to facilitate timely maintenance of the gas pipeline by maintenance personnel.

FIG. 1 is a schematic diagram illustrating a platform structure of an Internet of Things (IoT) system for monitoring welding of a smart gas pipeline based on government supervision according to some embodiments of the present disclosure.

As shown in FIG. 1, the IoT system 100 for monitoring welding of the smart gas pipeline based on government supervision comprises: a smart gas government safety supervision platform 110, a smart gas government safety supervision sensing network platform 120, a smart gas government safety supervision object platform 130, a gas company sensing network platform 140, and a gas construction object platform 150.

The smart gas government safety supervision platform 110 is configured for supervision and safety management of the gas pipeline welding process. In some embodiments, the smart gas government safety supervision platform 110 may be set on at least one distributed server. The distributed server includes a storage device.

In some embodiments, the smart gas government safety supervision platform 110 is configured to determine monitoring parameters of a preset pipeline region and send the monitoring parameters to the gas company management platform 131.

In some embodiments, the smart gas government safety supervision platform 110 includes a government supervision comprehensive database 111.

The government supervision comprehensive database 111 may be configured for storing data related to a gas pipeline and a welding process, such as pipeline construction information, welding key information, a welding inspection result, design delivery pressure, second environmental information, or the like. In some embodiments, the government supervision comprehensive database 111 is configured as a storage device.

The smart gas government safety supervision sensing network platform 120 is configured to transmit data related to welding and the environment and primarily serves government safety regulators for external regulation and compliance checks.

In some embodiments, the smart gas government safety supervision sensing network platform 120 is configured as a communication base station, a router, a wireless device, etc., and operates based on a communication network.

The smart gas government safety supervision object platform 130 is a platform configured for generating government regulatory information and executing control information.

In some embodiments, the smart gas government safety supervision object platform 130 includes a gas company management platform 131.

The gas company management platform 131 is a platform for managing parameters related to pipeline welding of a gas company. In some embodiments, the gas company management platform is set up on a gas company server.

In some embodiments, the gas company management platform 131 is configured to: obtain, through the gas company sensing network platform 140, at least one set of welding point information from the gas construction object platform 150, wherein each of the at least one set of welding point information corresponds to at least one welding point in the same preset pipeline region; obtain the pipeline construction information corresponding to each of the at least one set of welding point information from the gas construction object platform 150; determine a first welding risk based on the pipeline construction information; determine a first risk value based on the first welding risk and a historical welding risk; in response to determining that the first risk value meets a preset condition, generate a welding adjustment instruction and send the welding adjustment instruction to a welding personnel terminal of the gas construction object platform 150; obtain welding process information uploaded by the welding personnel terminal; perform a preset processing on the welding process information to obtain welding key information, send the welding key information and a welding inspection result to the smart gas government safety supervision platform 110, and store the welding key information and the welding inspection result in the government supervision comprehensive database 111; obtain monitoring parameters of the preset pipeline region through the smart gas government safety supervision platform 110.

In some embodiments, the gas company management platform 131 is further configured to: obtain point environmental information of each welding point from the gas construction object platform 150, generate first environmental information based on environmental information of the preset pipeline region and the point environmental information; assess a second welding risk of each welding point based on the first environmental information and the pipeline construction information; and determine an early warning notification based on the second welding risk and send the early warning notification to the gas construction object platform 150.

In some embodiments, the second welding risk includes second instantaneous welding risks at a plurality of time points and a second cumulative welding risk. The gas company management platform 131 is further configured to determine the second cumulative welding risk based on the second instantaneous welding risks at the plurality of time points.

In some embodiments, the gas company management platform 131 is further configured to: obtain the second instantaneous welding risks at the plurality of time points based on the first environmental information and the pipeline construction information through a risk prediction model.

In some embodiments, the gas company management platform 131 is further configured to: obtain design delivery pressure; determine a welding risk threshold for each welding point based on the design delivery pressure; and in response to determining that the second welding risk is greater than the welding risk threshold, generate the early warning notification and send the early warning notification to the gas construction object platform 150.

In some embodiments, the gas company management platform 131 is further configured to: determine the welding risk threshold based on the design delivery pressure and a pressure fluctuation range in a neighboring preset pipeline region.

In some embodiments, the gas company management platform 131 is further configured to: determine a focused inspection region and a general inspection region based on the second welding risk and the welding process information; generate an inspection device plan of the focused inspection region and the general inspection region during a welding inspection phase after completing welding; generate at least one set of devices to be inspected and inspector information corresponding to the at least one set of the device to be inspected based on the inspection device plan, send the at least one set of the device to be inspected and the inspector information to a corresponding inspector terminal in the gas construction object platform 150, and perform inspection and determine the welding inspection result based on the at least one set of devices to be inspected.

In some embodiments, the gas company management platform 131 is further configured to: determine a pipeline hazard level of the preset pipeline region based on the welding inspection result and store the pipeline hazard level in the government supervision comprehensive database 111.

In some embodiments, the gas company management platform 131 is further configured to: in response to determining the welding inspection result satisfying a second preset condition, determine the pipeline hazard level based on a welding quality grading of at least one welding point and a design delivery pressure.

The gas company sensing network platform 140 is configured for monitoring and transmitting data related to pipeline welding and primarily serves the gas company for internal management and operational optimization.

In some embodiments, the gas company sensing network platform 140 may be set up on a gas company communication device and operate based on a communication network.

The gas construction object platform 150 is a platform for managing construction an object of a gas pipeline. In some embodiments, the gas construction object platform 150 is configured to be communicatively coupled to an inspection device, a welding personnel terminal, an inspector terminal, or the like. The inspection device is a device used to perform an inspection of a gas pipeline welding, such as a gas tightness tester, an environmental sensor, or the like. The environmental sensor includes a soil sensor (sensing temperature and humidity of the soil, etc.), a vegetation index sensor, a remote sensing image sensor, etc.

In some embodiments, the gas construction object platform 150 is configured to obtain the welding inspection result via an inspection device, and obtain the point environmental information based on a soil sensor, a vegetation index sensor, a remote sensing image sensor, or the like.

The welding personnel terminal is a terminal device used by a welder who performs welding on the gas pipeline, such as a personal computer, a mobile device, or the like. In some embodiments, the welder may upload the welding process information to the gas construction object platform 150 via the welding personnel terminal. In some embodiments, the gas construction object platform 150 may be set up on a gas company server.

In some embodiments, the gas construction object platform 150 is configured to: obtain at least one set of welding point information and pipeline construction information corresponding to each of the at least one set of the welding point information.

In some embodiments, the gas company management platform 131 may generate a first welding risk and an early warning notification, and send the first welding risk and the early warning notification to the gas construction object platform 150 via the gas company sensing network platform 140.

More descriptions of the above embodiments may be found in FIG. 2-FIG. 5 and the related descriptions.

In some embodiments of the present disclosure, the IoT system for monitoring welding of the smart gas pipeline based on government supervision can form a closed-loop of information operation between the gas company management platform and other platforms, and coordinate and operate regularly under a unified management of the gas company management platform to realize the informatization and intellectualization of the gas fire linkage management.

It should be noted that the above description of the IoT system for monitoring welding of the smart gas pipeline based on government supervision is only for descriptive convenience, and does not limit the present disclosure to the scope of the cited embodiments. It is to be understood that for those skilled in the art, after understanding the principle of the system, it may be possible to arbitrarily combine various platforms or constitute subsystems to be connected to other platforms without departing from the principle. In some embodiments, the smart gas government safety supervision platform 110, the smart gas government safety supervision sensing network platform 120, the smart gas government safety supervision object platform 130 disclosed in FIG. 1, the gas company sensing network platform 140, and the gas construction object platform 150 may be different platforms in a single system, or a single platform realizing the functions of two or more of the above mentioned platforms. For example, the individual platforms may share a storage database, or the individual platforms may each have a respective storage database. Morphs such as these are within the scope of protection of the present disclosure.

FIG. 2 is an exemplary flowchart illustrating a method for monitoring welding of a smart gas pipeline based on government supervision according to some embodiments of the present disclosure. As shown in FIG. 2, a process 200 includes operations 201-280 as described below. In some embodiments, the process 200 may be performed by a gas company management platform 131.

In 210, obtaining, through the gas company sensing network platform, the at least one set of welding point information from the gas construction object platform.

The welding point information is information about a location where a welding is scheduled to perform.

In some embodiments, the gas company management platform 131 may obtain, through the gas company sensing network platform 140, the at least one set of welding point information from the gas construction object platform 150, wherein each of the at least one set of welding point information corresponds to at least one welding point in a same preset pipeline region In some embodiments, the welding point information may be transmitted by a work order management center to the gas construction object platform 150, and/or the welding point information may be corrected by the welding personnel terminal and the welding point information may be uploaded to the gas construction object platform 150. The work order management center is a service center for dispatching gas pipeline welding work orders. The work order management center may be configured on a gas company server. More descriptions of the welding personnel terminal may be found in FIG. 1 and the related descriptions.

The preset pipeline region refers to a preset region in a gas piping system. The preset pipeline region may be preset based on geographic location, management, or functional requirements. For example, the preset pipeline region may be a pipeline region set by a gas geographic information system (GIS). As another example, a pipeline branch (e.g. from valve A to valve B) may be set as the preset pipeline region.

In 220, obtaining pipeline construction information corresponding to each of the at least one set of the welding point information from the gas construction object platform.

The pipeline construction information is construction data and information related to pipeline construction. For example, the pipeline construction information may include pipeline material, burial depth, inclination and inclination direction, length, etc., of a gas pipeline.

In some embodiments, the gas company management platform 131 may be configured to obtain pipeline construction information corresponding to each set of welding point information via a welding personnel terminal of the gas construction object platform 150.

In 230, determining a first welding risk based on the pipeline construction information.

The first welding risk is a welding risk associated with the pipeline construction information. In some embodiments, the first welding risk includes a risk type and a risk level, and different pipeline construction information corresponds to different risk types and risk levels of the first welding risks. For example, the risk level is set to 1-10, and the risk type includes an electric shock risk, a fire risk, a welding deformation risk, or the like.

In some embodiments, the gas company management platform 131 may look up a first preset table to determine the risk type and risk level of the first welding risk based on the pipeline construction information. The first preset table includes a mapping relationship between the pipeline construction information and the risk type and risk level of the first welding risk. In some embodiments, the gas company management platform 131 may determine the mapping relationship based on historical welding data. For example, a risk level corresponding to a risk type that a count of failures corresponding to the historical pipeline construction information reaches a preset count threshold is determined to be a risk level of 10.

In 240, determining a first risk value based on the first welding risk and a historical welding risk.

The historical welding risk is a welding risk occurring in a historical time period. For example, there is no historical welding risk if the gas pipeline is a new pipeline. If the gas pipeline is a repaired and modified pipeline, the historical welding risk may be a historical welding risk that occurred on the gas pipeline before the repair and modification.

The first risk value refers to the likelihood of different types of risk occurring in the gas pipeline. The first risk value may be expressed as a score or probability.

In some embodiments, the gas company management platform 131 may determine sub-first risk values corresponding to different risk types based on risk levels and risk types in historical welding risks and the first welding risk by weighted calculation, and weights corresponding to the first welding risk and the historical welding risks may be manually preset; based on the sub-first risk values corresponding to the different risk types and weights of the different risk types, determine the first risk value by weighted calculation. The weights of the different risk types may be set based on an actual situation, e.g., a higher weight may be set for a risk of electrocution, a risk of fire, etc., while a lower weight may be set for a risk of welding deformation.

In 250, in response to determining that the first risk value meets a preset condition, generating a welding adjustment instruction and sending the welding adjustment instruction to a welding personnel terminal of the gas construction object platform.

The preset condition includes the first risk value being greater than a preset risk threshold.

The welding adjustment instruction refers to an instruction message used to indicate an adjustment to a welding process. For example, the welding adjustment instruction may include an adjusted welding sequence, a count of welds per batch, or the like.

In some embodiments, the gas company management platform 131 may sort all first risk values greater than the preset risk threshold in descending order to determine an order of welding, with those having a large first risk value being prioritized for welding; and, determine the count of welds per batch based on a count of welding devices and a count of fire protection facilities. For the welding points where the first risk value is less than or equal to the preset risk threshold, the welding order can be adjusted to the last.

An initial welding sequence is generally sequential, but if welding work is frequent, a region with a high first risk value has a high likelihood of accidents (e.g., damage to welding device, or other fires, etc.), welding devices or firefighting measures may not be put in place in time due to limited availability of the welding devices or the firefighting measures. The gas pipelines with a high first risk value can be prioritized for welding, which allows sufficient time for subsequent professional inspection and testing, as well as sufficient professional staff and device, firefighting device, etc. in case of emergency.

In 260, obtaining welding process information uploaded by the welding personnel terminal.

The welding process information refers to relevant data that is collected while the welding activity is taking place, such as welding process images, welding time, welding material usage, whether or not to reweld, and a count of reweld.

In some embodiments, the gas company management platform 131 may obtain the welding process information uploaded by the welding personnel terminal of a gas construction object platform 150 via a gas company sensing network platform 140. More descriptions of the welding personnel terminal may be found in FIG. 1 and the related descriptions.

In 270, performing a preset processing on the welding process information to obtain welding key information, sending the welding key information and a welding inspection result to a smart gas government safety supervision platform, and storing the welding key information and the welding inspection result in a government supervision comprehensive database.

The welding key information refers to welding process information that reflects key operations of welding. The welding key information includes welding key images.

The preset processing refers to a process of optimizing the welding process information. For example, the preset processing may include extracting a welding key image in a welding process image by preprocessing, image segmentation techniques, feature extraction, or the like. The preprocessing may include graying, filtering, edge detection, or the like. The image segmentation techniques include separating a welding key region from the background in the welding process image. The feature extraction includes identifying the welding key image and extracting the welding key image from the whole welding process image by features such as shape, texture, and color, or the like.

The welding inspection result refers to a testing result of welding quality of a welding point after the welding is completed. More descriptions of the welding inspection result may be found in FIG. 5 and the related descriptions.

In 280, obtaining monitoring parameters of the preset pipeline region through the smart gas government safety supervision platform.

The monitoring parameters refer to operating parameters of monitoring device. For example, the monitoring parameters include a monitoring frequency of the monitoring device.

The monitoring device refers to a device for obtaining environmental information about the preset pipeline region. In some embodiments, the monitoring device may be configured as a humidity sensor, a wind sensor, or the like. The monitoring parameters may be determined via the smart gas government safety supervision platform 110. The monitoring device may be communicatively coupled with the smart gas government safety supervision platform 110.

In some embodiments, the smart gas government safety supervision platform 110 may determine monitoring parameters based on historical welding inspection results. For example, the higher a count and the more locations of poor welding quality in the historical welding inspection results of the preset pipeline region, the higher the monitoring frequency of the monitoring device.

Welding in the field after a gas pipeline trench excavation is susceptible to a plurality of uncontrollable factors. The preset pipeline region may be more than a few kilometers long, and the information on different welding points may vary greatly. The welding risk of each welding point can be more accurately assessed by analyzing the welding point information of different welding points in the preset pipeline region. By performing welding on welding points with higher risk value in priority, it can ensure that welding devices are enough or personnel in place in time, thus preventing the occurrence of welding accidents or reducing damage caused by the welding accidents. By the above method, it is possible to ensure stability of the welding process throughout the entire preset pipeline region and to improve welding efficiency.

FIG. 3 is an exemplary flowchart illustrating a process for determining an early warning notification according to some embodiments of the present disclosure. As shown in FIG. 3, a process 300 includes operations 310-330 as described below. In some embodiments, the process 300 may be performed by a gas company management platform 131.

In 310, obtaining point environmental information of each welding point from the gas construction object platform, generating first environmental information based on environmental information of the preset pipeline region and the point environmental information.

The point environmental information refers to environment-related information near the welding point, such as soil information, vegetation information, wind power, or the like, near the welding point. Different welding points correspond to different point environmental information. In some embodiments, the gas company management platform 131 may obtain the point environmental information based on a gas construction object platform 150.

The environmental information of the preset pipeline region refers to information reflecting an overall environmental condition in the preset pipeline region, for example, the weather, humidity, or the like, in the preset pipeline region. In some embodiments, the gas company management platform 131 may obtain the environmental information of the preset pipeline region uploaded by a monitoring device based on a smart gas government safety supervision platform 110. More descriptions of the monitoring device may be found in FIG. 2 and the related descriptions.

For different welding points in the same preset pipeline region, corresponding environmental information is largely the same while corresponding point environmental information may be different.

The first environmental information refers to relevant information reflecting the current environment when welding the gas pipeline. For example, the first environmental information includes weather, humidity, temperature, soil information, vegetation information, or the like, at an environment where gas pipeline to be welded at a current welding point is located. In some embodiments, each welding point corresponds to one first environmental information.

In some embodiments, for a certain welding point, the gas company management platform 131 may use the environmental information of a preset pipeline region in which the welding point is located and point environmental information corresponding to the welding point as the first environmental information of the welding point.

In 320, assessing a second welding risk of each welding point based on the first environmental information and the pipeline construction information.

The second welding risk refers to a risk of the welding process due to environmental factors.

In some embodiments, the gas company management platform 131 may determine the second welding risk based on the first environmental information and the pipeline construction information through multiple methods.

For example, for a certain welding point, the gas company management platform 131 may determine an environmental impact factor based on the first environmental information of the welding point; determine the first welding risk based on the pipeline construction information; and determine the second welding risk of the welding point as the product of the environmental impact factor and the first welding risk. More descriptions of the determination of the first welding risk based on the pipeline construction information may be found in FIG. 2 and the related descriptions.

In some embodiments, the gas company management platform 131 may look up a second preset table based on the first environmental information of the welding point, determine an impact factor corresponding to different first environmental information, and calculate the environmental impact factor based on the impact factor corresponding to different first environmental information.

The second preset table includes different first environmental impact information and the corresponding impact factors. The impact factor includes a humidity impact factor, a weather impact factor, a wind impact factor, a soil information impact factor, and a vegetation information impact factor. The impact factor may be determined by manually assessing an impact degree of the different first environmental information.

In some embodiments, the gas company management platform 131 may calculate the environmental impact factor based on an equation (1), which is shown below:

$$
\text{Environmental impact factor} = \hspace{2cm} (1)
$$
$$
\text{humidity impact factor} \times k1 + \text{weather impact factor} \times k2 +
$$
$$
\text{wind impact factor} \times k3 + \text{soil information impact factor} \times k4 +
$$
$$
\text{vegetation information impact factor} \times k5
$$

k1-k5 indicate coefficients being greater than 0, which may be manually preset according to an actual situation.

In some embodiments, the second welding risk includes second instantaneous welding risks at a plurality of time points and a second cumulative welding risk.

The second instantaneous welding risk refers to a welding risk caused by environmental factors at a specific time point. In some embodiments, for a time point, the gas company management platform 131 may determine different impact factors based on the first environmental information obtained at that point in time; determine an environmental impact factor of the time point based on the different impact factors corresponding to the time point by means of the equation (1); and determine the product of the environmental impact factor and the first welding risk as the second instantaneous welding risk of the time point.

The first environmental information of the time point may be determined by the environmental information of the preset pipeline region and the point environmental information measured at the time point, more descriptions may be found in the related descriptions above.

In some embodiments, the gas company management platform 131 may also obtain the second instantaneous welding risks at the plurality of time points based on the first environmental information and the pipeline construction information through a risk prediction model. More descriptions may be found in FIG. 4 and the related descriptions.

The second cumulative welding risk refers to a combined welding risk caused by the environmental factors at a plurality of time points.

In some embodiments, the gas company management platform 131 may determine the second cumulative welding risk based on the second instantaneous welding risks at the plurality of time points. The plurality of time points refers to a plurality of selected time points from past to a current preset time period. The second cumulative welding risk is positively correlated with the second instantaneous welding risk at the plurality of time points.

For example, the gas company management platform 131 may calculate the second cumulative welding risk based on an equation (2), which is shown below:

$$
\text{Second cumulative welding risk} = \hspace{2cm} (2)
$$
$$
A1 \times a1 + A2 \times a2 + A3 \times a3 + \ldots + An \times an
$$

A1-An indicate second instantaneous welding risks from a first time point to a nth time point; and a1-an indicate weights corresponding to the second instantaneous welding risk from the first time point to the nth time point. The weights may be manually preset. For example, the closer the time point is to a current time, the greater the weights are. As another example, the weight i may be determined based on a difference between an environmental impact factor at a time point i and an environmental impact factor at a time point i-1. The greater the difference, the greater the weight. That is, a point in time at which the first environmental information has changed significantly corresponds to a higher weight for the second instantaneous welding risk; when the first environmental information has not changed, the weight may be set to a value of 0 or a lower value.

According to some embodiments of the present disclosure, the second cumulative welding risk is determined based on the second instantaneous welding risk at the plurality of time points, which can reflect a cumulative effect of a change in the environment of the welding point over time on the second welding risk. A target early warning notification is made based on changes in the second welding risk, facilitating preventative measures by maintenance personnel.

In 330, determining an early warning notification based on the second welding risk and sending the early warning notification to the gas construction object platform.

The early warning notification refers to a notification warning that there is a welding risk in a gas pipeline. The early warning notification may be in a form of voice, text, or the like. In some embodiments, the early warning notification may include a welding point, an early warning level, or the like, where a welding risk exists. The warning level reflects severity of the welding risk.

In some embodiments, the gas company management platform 131 may determine the early warning notification based on the second welding risk by multiple processes. For example, the gas company management platform 131 may look up a third preset table to determine the early warning level based on the second welding risk. The third preset table includes different warning risk levels and corresponding ranges of the second welding risk, and the third preset table may be set manually based on experience.

In some embodiments, the gas company management platform 131 may obtain a design delivery pressure; obtain design delivery pressure; determine a welding risk threshold for each welding point based on the design delivery pressure; and in response to determining that the second welding risk is greater than the welding risk threshold, generate the early warning notification and sending the early warning notification to the gas construction object platform.

The design delivery pressure refers to delivery pressure of a gas pipeline determined when designing or planning.

In some embodiments, the gas company management platform 131 may obtain the design delivery pressure sent by a government supervision comprehensive database 111 via a smart gas government safety supervision sensing network platform 120. The smart gas government safety supervision platform 110 may obtain the design delivery pressure uploaded by a government user, and send the design delivery pressure to the government supervision comprehensive database 111.

The welding risk threshold refers to a critical value of the second welding risk.

In some embodiments, the gas company management platform 131 may look up a fourth preset table to determine a generic welding risk threshold to be used as the welding risk threshold based on the design delivery pressure. The fourth preset table includes mapping relationships between design delivery pressures and generic welding risk thresholds. The fourth preset table may be set based on experience, wherein the higher the design delivery pressure, the more likely the risk is to occur, and the lower the corresponding generic welding risk threshold is.

In some embodiments, the gas company management platform 131 may, in response to the second welding risk being greater than the welding risk threshold, calculate a difference between the second welding risk and the welding risk threshold; look up a preset early warning form based on the difference to determine a warning level of the early warning notification, and send the early warning notification with the warning level to the gas construction object platform 150. The preset early warning form includes a mapping relationship of the difference between the second welding risk, the welding risk threshold, and the warning level. The mapping relationship is preset based on experience or demand, with the higher the difference indicating a higher risk, the higher the warning level.

Determining the welding risk threshold based on the design delivery pressure can make the welding risk threshold more reasonable, and avoid excessive and ineffective early warning notifications or resulting in unnecessary additional inspections, thus reducing maintenance costs while ensuring welding safety.

In some embodiments, the gas company management platform 131 may also determine a welding risk threshold based on design delivery pressure and a pressure fluctuation range in a neighboring preset pipeline region.

The neighboring preset pipeline region corresponds to upstream pipelines and downstream pipelines or pipeline branches of the preset pipeline region where a current welding point is located.

The pressure fluctuation range reflects pressure fluctuations of the gas pipeline, including an upper limit of the pressure fluctuations and a lower limit of the pressure fluctuation.

The pressure fluctuation range the preset pipeline region is related to the pipeline connection and the pipe material in the pipeline construction information. The pipeline connection situation reflects a connection relationship of neighboring pipeline regions in the preset pipeline region.

In some embodiments, the pipeline connection situation includes an out-degree and an in-degree. The out-degree refers to a count of pipes where a direction of gas flow is in a direction of outflow among all pipes connected to a given pipeline. The in-degree is the number of pipes in which the gas flow direction is inflow in all pipes connected to a given pipeline. For a welding point, the pipeline connection situation corresponding to the welding point is a pipeline connection situation of the pipe in which the welding point is located.

In some embodiments, the gas company management platform 131 may construct a first feature vector based on at least one of the pipeline connection situation and the pipeline material, look up a fifth preset table, and take a historical pressure fluctuation range corresponding to the first reference vector with highest similarity to the first feature vector, as the pressure fluctuation range of the preset pipeline region. The fifth preset table includes first reference vectors and corresponding historical pressure fluctuation ranges, wherein the first reference vector is constructed based on a historical pipeline connection and a historical pipeline material. The historical pipeline connection includes at least a historical out-degree and a historical in-degree. The out-degree has a greater impact on the range of pressure fluctuations because pipelines are more susceptible to the pressure fluctuation range due to downstream gas-using customers. The pipe material affects parameters such as gas delivery flow resistance and pressure drop. The similarity may be determined by a vector distance, and the similarity is positively correlated with the vector distance.

In some embodiments, the gas company management platform 131 may determine a generic welding risk threshold based on the design delivery pressure, determine a pressure fluctuation coefficient based on the design delivery pressure and a pressure fluctuation range; and, determine the welding risk threshold based on the generic welding risk threshold and the pressure fluctuation coefficient. More descriptions of determining the generic welding risk threshold based on the design delivery pressure may be found in FIG. 3 and the related descriptions.

The pressure fluctuation coefficient is positively correlated with the pressure fluctuation range and negatively correlated with the design delivery pressure. For example, the gas company management platform 131 calculates the pressure fluctuation coefficient via an equation (3), which is shown below:

$$\text{Pressure fluctuation coefficient} = \qquad (3)$$

$$\text{maximum value in the pressure fluctuation range/}$$

$$\text{design delivery pressure}$$

Wherein the maximum value in the pressure fluctuation range may be a maximum value of an upper absolute value of the pressure fluctuation and a lower absolute value of the pressure fluctuations.

In some embodiments, the welding risk threshold is positively correlated with the generic welding risk threshold and negatively correlated with the pressure fluctuation coefficient. For example, the gas company management platform 131 can calculate the welding risk threshold by using an equation (4), which is shown below:

$$\text{Welding risk threshold} = \text{generic welding risk threshold} \times \quad (4)$$
$$(1 - \text{pressure fluctuation coefficient})$$

According to some embodiments of the present disclosure, the design delivery pressure and the pressure fluctuation range of neighboring preset pipelines may be combined to determine the welding risk threshold, which fully considers pipeline environment of the preset pipeline region in upstream and downstream, and the pipeline material, making the determination of the welding risk threshold more consistent with actual conditions, thus avoiding the situation where the platform sends excessive ineffective early warnings or early warning fail.

According to some embodiments of the present disclosure, due to the dispersed distribution of welding points of the gas pipeline in the preset pipeline region, the welding operation is easily affected by environmental changes, thus presenting a risk in the welding process, which may impact the quality of the welding or jeopardize the safety of persons and property; by combining the environmental information of the preset pipeline region and the point environmental information of different welding points, the second welding risk of each welding point is evaluated and an early warning is issued, which better meets the needs for actual safe welding and high-quality welding.

It should be noted that the description of process 300 is intended to be exemplary and illustrative only and does not limit the scope of application of the present disclosure. For hose skilled in the art, various corrections and changes may be made to process 300 under the guidance of the present disclosure. However, these corrections and changes remain within the scope of the present disclosure.

Figure 4:
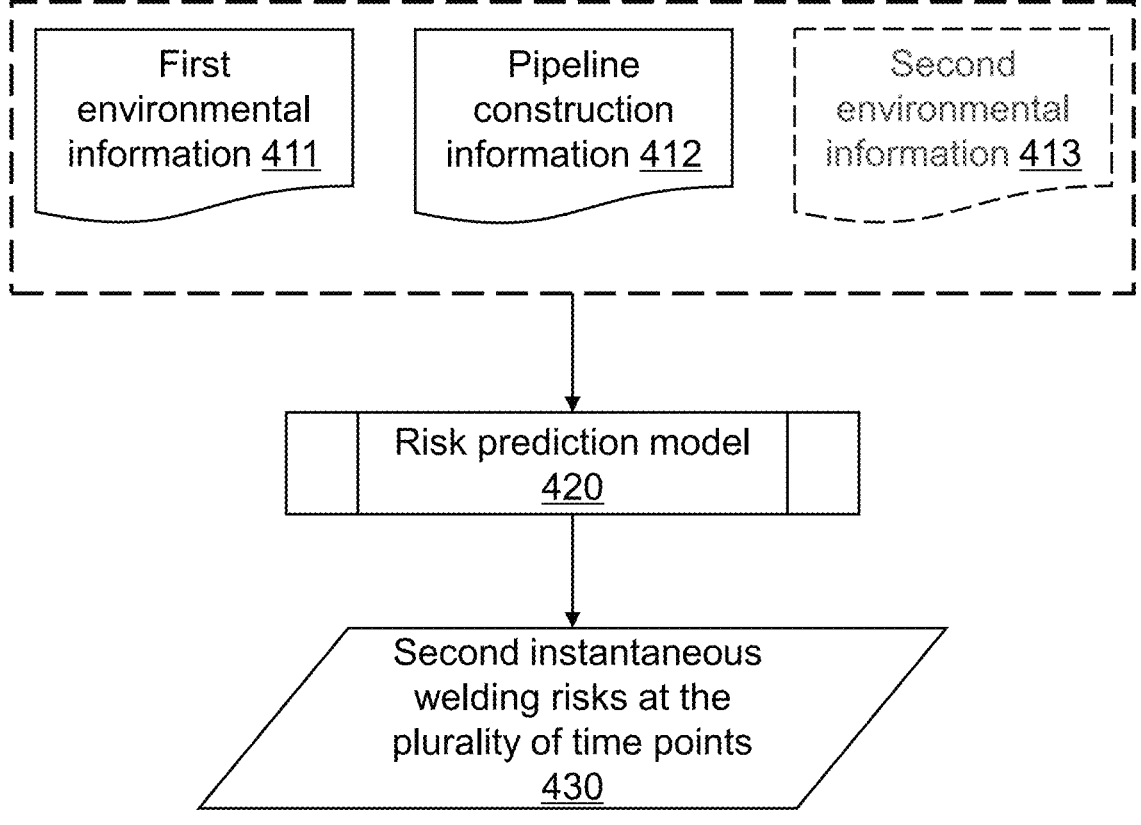
FIG. 4 is an exemplary schematic diagram illustrating a risk prediction model according to some embodiments of the present disclosure.

FIG. 4 is an exemplary schematic diagram illustrating a risk prediction model according to some embodiments of the present disclosure.

In some embodiments, as shown in FIG. 4, the gas company management platform 131 may obtain the second instantaneous welding risks 430 at the plurality of time points based on the first environmental information 411 and the pipeline construction information 412 through a risk prediction model 420.

The risk prediction model 420 is a model for predicting the second instantaneous welding risks at the plurality of time points. In some embodiments, the risk prediction model 420 is a machine learning model, such as at least one of a Long-Short Term Memory (LSTM) model, a Recurrent Neural Network (RNN) model, or other models.

In some embodiments, the risk prediction model may be obtained by training a large number of training samples and training labels corresponding to the training samples. For example, the gas company management platform 131 performs multiple rounds of iterations with the large number of training samples and training labels, and the iterations are terminated when a preset condition is satisfied to obtain the trained risk prediction model. The preset condition may be that a loss function converges, a count of iterations reaches a threshold, or the like.

In some embodiments, the gas company management platform 131 may select a plurality of training samples, input one or more samples into the prediction model, and obtain a model prediction output corresponding to the plurality of training samples; substitute the model prediction output corresponding to the one or more samples and the training labels into an equation of the predefined loss function, calculate a value of the loss function; based on the value of the loss function, updating the model parameters in the initial risk prediction model by gradient descent or other processes in reverse iteration.

Each set of training samples in the training samples may include sample first environmental information and sample pipeline construction information. The training samples may be obtained from historical data generated by a historical welding process. The training labels corresponding to the training samples are sample second instantaneous welding risks corresponding to each set of training samples. The training labels is obtained by manual labeling or automatic labeling.

The training labels may be determined based on subsequent incidents that actually occurred during the historical welding process. For example, if an accident occurs during the historical welding process, the training label is set to 6-10, at which point the value of the training label may be determined based on the severity of the accident and the damage, which may be obtained from a government supervision comprehensive database. For another example, if no accident occurred during the historical welding process as of the present time, the training label is set to 1-5, and at that time, the value of the training label may be determined based on the time interval between the historical point in time and the present time, where the historical point in time refers to the time point corresponding to the first environmental information of the sample; the longer the time interval, the lower the value of the training label.

In some embodiments, the risk prediction model 420 includes an environmental feature extraction layer and a risk assessment layer.

The environmental feature extraction layer is a model for extracting an environmental feature vector. The environmental feature extraction layer may be a machine learning model, e.g., an LSTM model, or the like. In some embodiments, an input of the environmental feature extraction layer includes the first environmental information 411, and an output includes an environmental feature vector.

The risk assessment layer is a model for assessing the second instantaneous welding risk at the welding point. Inputs to the risk assessment layer include environmental feature vectors and the pipeline construction information 412 outputted by the environmental feature extraction layer, and outputs include the second instantaneous welding risks 430 at the plurality of time points.

In some embodiments, the gas company management platform 131 may use a trained environmental feature extraction layer and a trained risk assessment layer as the risk prediction model 420. In some embodiments, the environmental feature extraction layer and the risk assessment layer may be obtained by joint training.

In some embodiments, sample data for the joint training may be obtained by training a large number of training samples and the training labels corresponding to the training samples. More descriptions of the training samples may be found the related descriptions above.

For example, the gas company management platform 131 may input the sample first environmental information into the environmental feature extraction layer to obtain the environmental feature vector output by the environmental feature extraction layer; and use the environmental feature vector and the sample pipeline construction information as training sample data, input the training sample data into the risk assessment layer to obtain the second instantaneous welding risks at the plurality of time points output from the risk assessment layer; determine the second instantaneous welding risk output from the association type determination layer model based on actual second instantaneous welding risks; and, synchronously update parameters of the environmental feature extraction layer and the risk assessment layer. The trained environmental feature extraction layer and the trained risk assessment layer are obtained through updating the parameters. More descriptions of the model training may be found above and the related descriptions.

Some embodiments of the present disclosure, predicting the second instantaneous welding risk through the risk prediction model can improve the efficiency and accuracy of the prediction and reduce misclassification, resulting in more accurate early warning notifications for subsequent determinations.

In some embodiments, as shown in FIG. 4, input to the risk prediction model further includes second environmental information 413. For example, the second environmental information 413 may be input to the environmental feature extraction layer, and the environmental feature extraction layer may determine the environmental feature vector based on the first environmental information and the second environmental information.

The second environmental information refers to information relating to future environment in which a pipeline will be situated in future after the pipeline is put into service. The second environmental information may reflect the environmental conditions in the preset pipeline region for a long period of time in the future.

In some embodiments, the gas company management platform 131 may obtain future climate information and a weather forecast of a local region in which the preset pipeline region is located from the government supervision comprehensive database as the second environmental information.

In some embodiments, the corresponding training samples may include sample first environmental information, sample pipeline construction information, and sample second environmental information. The gas company management platform 131 may input the sample first environmental information and the sample second environmental information into the environmental feature extraction layer to obtain the environmental feature vector output by the environmental feature extraction layer.

Taking the second environmental information as an input to the risk prediction model also takes into account a long-term environmental impact of the pipeline after putting into service, which in turn allows for the determination of the second instantaneous welding risk that is more consistent with the future environment. Based on the second instantaneous welding risk, the maintenance of gas pipelines is conducted in advance during the pipeline construction phase to avoid unintended failures or hidden dangers after the pipeline is put into use, thereby ensuring that the operation of the gas pipeline is safe and reliable.

In some embodiments, model training of the risk prediction model includes first training samples and second training samples.

In some embodiments, the first training samples include sample pipeline construction information that satisfies a first preset condition, sample first environmental information that satisfies the first preset condition, and sample second environmental information that satisfies the first preset condition. The second training samples include sample pipeline construction information that does not satisfy the first predetermined condition, sample first environmental information that does not satisfy the first predetermined condition, and sample second environmental information that does not satisfy the first predetermined condition.

The first preset condition may include that a fluctuation value of the first environmental information and a fluctuation value of the second environmental information are both less than a preset fluctuation threshold during a preset time period. The fluctuation value of the first environmental information is a difference between a maximum value and a minimum value of the first environmental information during the preset time period, such as a difference between a maximum value and a minimum value of the humidity, and/or a difference between a maximum value and a minimum value of the wind. The fluctuation value of the second environmental information is the same. For example, the first preset condition may include that neither the first environmental information nor the second environmental information during a preset period of time contains abnormal weather.

In some embodiments, a count of the first training samples and a count of the second training samples may be a preset ratio. The manner of determining the training labels corresponding to the first training samples and the second training samples is similar to the manner of determining the training labels of the risk prediction model. More descriptions may be found above and the related descriptions.

The training samples satisfying the first preset condition indicates that an environmental change is stable, and by selecting the first training samples when the environmental change is stable and second training samples when the environment fluctuates greatly for the risk prediction model, application scenarios and stability of the risk prediction model can be increased.

Figure 5:
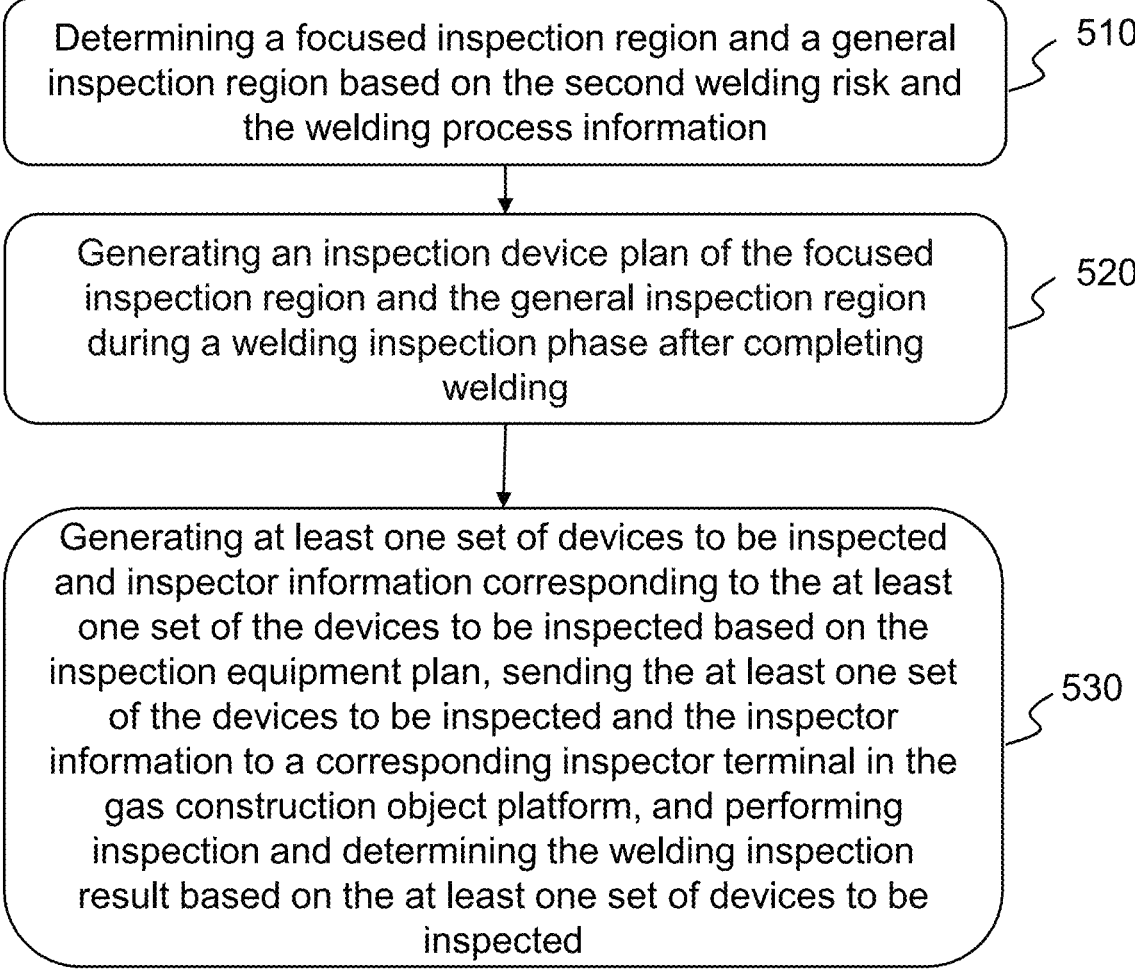
FIG. 5 is an exemplary flowchart illustrating a process for determining a welding inspection result according to some embodiments of the present disclosure.

FIG. 5 is an exemplary flowchart illustrating a process for determining a welding inspection result according to some embodiments of the present disclosure. As shown in FIG. 5, a process 500 includes operations 510-530 below. The operations 510-530 may be performed by the gas company management platform 131.

In 510, determining a focused inspection region and a general inspection region based on the second welding risk and the welding process information. More descriptions of the second welding risk can be found in FIG. 3; more descriptions of the welding process information can be found in FIG. 2.

The focused inspection region is a region consisting of a plurality of welding points that require focused attention.

The general inspection region is a region consisting of a plurality of welding points that require general attention.

In some embodiments, the gas company management platform 131 may select a plurality of welding points for which the second instantaneous welding risk exceeds the welding risk threshold, and construct a plurality of second reference vectors based on welding process information, second welding risk and pipeline construction information corresponding to the plurality of welding points, and a physical distance between two welding points among the plurality of welding points; determine a plurality of clustering centers by clustering the plurality of second reference vectors, and at least one welding point corresponding to the second reference vectors contained in the clustering clusters of each clustering center serves as the focused inspection region.

In some embodiments, the gas company management platform 131 may treat the remaining welding points in the plurality of welding points excluding the welding points included in the focused inspection region in which the second instantaneous welding risk exceeds the welding risk threshold as the general inspection region. More descriptions of the welding risk threshold may be found in FIG. 3 and the related descriptions.

In 520, generating an inspection device plan of the focused inspection region and the general inspection region during a welding inspection phase after completing welding.

The inspection device plan includes an inspection order and a count of inspection devices needed. In some embodiments, the gas company management platform 131 may identify the focused inspection region as a prioritized inspection region; determine a count of the inspection devices based on a count of welding points in the prioritized inspection region, for example, each welding point may be configured with one or more detection devices. Each welding point in the prioritized inspection region may require at least one inspection device to work together.

In some embodiments, the gas company management platform 131 may set the count of detection devices in the general inspection region to a default count. The default count may be manually preset based on experience, and the default number may be less than the count of welding points in the focused inspection region. Each inspection device in the general inspection region may detect a plurality of welding points.

In 530, generating at least one set of devices to be inspected and inspector information corresponding to the at least one set of the devices to be inspected based on the inspection device plan, sending the at least one set of the devices to be inspected and the inspector information to a corresponding inspector terminal in the gas construction object platform, and performing inspection and determining the welding inspection result based on the at least one set of devices to be inspected. The inspector information includes the number of inspectors.

In some embodiments, the gas company management platform 131 may look up a sixth preset table to determine the device to be inspected and the corresponding inspector information based on the planning of the inspection device for the focused inspection region and the general inspection region, respectively. The sixth preset table includes a mapping relationship of the inspection device plan to the device to be inspected and the inspector information. The mapping relationship may be set artificially.

The welding inspection is an inspection of the welding condition of the pipeline after welding, and the welding inspection includes a gas-tightness inspection and a test run inspection. The welding inspection result refers to a result of the inspector for welding quality of the welding point after the welding is completed. For example, the welding inspection result includes whether the weld has hidden defects.

By setting up different device to be inspected and assigning different inspectors in the focused inspection region and the general inspection region, it is possible to improve the inspection efficiency and save labor costs.

In some embodiments, the gas company management platform 131 may determine a pipeline hazard level of the preset pipeline region based on the welding inspection result and store the pipeline hazard level in the government supervision comprehensive database 11.

The pipeline hazard level reflects a likelihood that a pipeline has a welding hazard. For example, the pipeline hazard level may be set to 1-10, with the higher pipeline hazard level indicating a higher likelihood of the welding hazard in the pipeline. In some embodiments, the gas company management platform 131 may determine the pipeline hazard level to be a highest level based on the presence of a hidden danger in the welding inspection result.

Maintenance of gas pipelines places more emphasis on the overall degree of hidden danger of the pipeline, as well as the safety and reliability of the pipeline after operation. Therefore, analyzing the welding inspection result to determine the level of hidden danger of the pipeline aligns more closely with the actual needs of subsequent targeted risk prevention, providing effective support.

In some embodiments, in response to determining the welding inspection result satisfying a second preset condition, the gas company management platform 131 may determine the pipeline hazard level based on a welding quality grading of the at least one welding point and a design delivery pressure.

The second preset condition refers to a preset condition that is satisfied by the welding inspection result. In some embodiments, the second preset condition may include that the welding inspection result is free of hidden risk.

The welding quality grading refers to a rating of the desired welding quality for different welding points. The welding quality grading indicates better welding quality.

In some embodiments, for a certain welding point, the gas company management platform 131 may construct a second feature vector, based on at least one of a welding process image, a welding time, a welding material amount, whether to reweld, and a count of times of rewelding in the welding process information; and find a reference welding quality grading corresponding to a third reference vector in a preset quality grading table that has the smallest distance from the second feature vector as the welding quality grading of the welding point.

The preset quality grading table includes a third reference vector and a corresponding reference welding quality grading. The third reference vector may be constructed based on historical welding process information and a corresponding reference welding quality grading. The preset quality grading table may be manually constructed based on the historical weld data and manual inspection grading of the welding quality. More descriptions of the welding process information may be found in FIG. 2 and the related descriptions.

In some embodiments, for a preset pipeline region, the gas company management platform 131 may determine a pressure fluctuation coefficient based on a design delivery pressure of the preset pipeline region; determine at least one pipeline hazard sub-level, based on the pressure fluctuation coefficient and the welding quality grading of the at least one welding point in the preset pipeline region; and determine the pipeline hazard level, based on a highest pipeline hazard sub-level among the at least one pipeline hazard sub-level and a hazard distance between a first welding point and a second welding point. The hidden hazard distance is a physical distance between the first welding point and the second welding point.

The first welding point refers to a welding point where the highest pipeline hazard sub-level is located in the preset pipeline region. The second welding point refers to a welding point where the highest pipeline hazard sub-level is located in the adjacent preset pipeline region. More descriptions of determining the pressure fluctuation coefficient based on the design delivery pressure may be found in FIG. 3 and the related descriptions.

In some embodiments, the pipeline hazard sub-level is positively correlated with the pressure fluctuation coefficient and negatively correlated with the welding quality grading. For example, the gas company management platform 131 may be calculated by an equation (5) to obtain the pipeline hazard sub-level. The equation (5) is shown below:

$$\text{Pipeline hazard sub-level} = \text{environmental impact factor} \times \quad (5)$$
$$(1 + \text{pressure fluctuation coefficient})/\text{welding quality grading}$$

More descriptions of the environmental impact factor and the pressure fluctuation coefficient may be found in FIG. 3 and the related descriptions.

In some embodiments, the pipeline hazard level of the preset pipeline region is positively correlated with the highest pipeline hazard sub-level of the at least one pipeline hazard sub-level of the preset pipeline region, and positively correlated with the hazard distance. For example, the gas company management platform 131 may calculate the pipeline hazard level based on an equation (6), which is shown below:

$$\text{Pipeline hazard level} = \text{highest pipeline hazard sub-level} \times \quad (6)$$
$$\text{hazard distance/reset risk distance}$$

More descriptions of the hazard distance may be found above and the related descriptions. The preset risk distance may be preset in advance and uploaded to the government supervision comprehensive database 111.

In some embodiments of the present disclosure, when the welding inspection result which is determined manually does not present a safety hazard, a pipeline hazard level of the preset pipeline region may be determined by at least one welding quality grading and the design delivery pressure, thereby avoiding human misjudgment and improving the judgment accuracy.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure. For example, "some embodiments" means a particular feature, structure, or characteristic associated with at least one embodiment of the present disclosure. Accordingly, it should be emphasized and noted that two or more references to "some embodiments" in different places in the present disclosure do not necessarily refer to the same embodiment.

Additionally, certain features, structures, or characteristics of one or more embodiments of the present disclosure may be suitably combined.

Furthermore, the order of the processing elements and sequences described herein, the use of numerical letters, or the use of other names are not intended to limit the order of the processes and methods described herein. While some embodiments of the invention that are currently considered useful are discussed in the foregoing disclosure by way of various examples, it should be appreciated that such details serve only illustrative purposes and are not limited to the disclosed embodiments. For example, although the implementation of various components described above may be embodied in a hardware device, it may also be implemented as a software only solution, e.g., an installation on an existing server or mobile device.

Similarly, it should be noted that to simplify the presentation of the disclosure of the present disclosure, and thereby aid in the understanding of one or more embodiments of the invention, the foregoing descriptions of embodiments of the present disclosure sometimes combine various features into a single embodiment, accompanying drawings, or descriptions thereof. Rather, claimed subject matter may lie in less than all features of a single foregoing disclosed embodiment.

Some embodiments use numbers to describe the number of components, attributes, and it should be understood that such numbers used in the description of the embodiments are modified in some examples by the modifiers "about," "approximately," or "substantially". Unless otherwise noted, the terms "about," "approximate," or "approximately" indicate that a ±20% variation in the stated number is allowed. Correspondingly, in some embodiments, the numerical parameters used in the present disclosure are approximations, which can change depending on the desired characteristics of the individual embodiment. In some embodiments, the numerical parameters should take into account the specified number of valid digits and employ general place-keeping. While the numerical domains and parameters used to confirm the breadth of their ranges in some embodiments of the present disclosure are approximations, in specific embodiments such values are set to be as precise as possible within a feasible range.

For each patent, patent application, patent application disclosure, and other material cited in the present disclosure, such as articles, books, manuals, publications, documents, etc., the entire contents of which are hereby incorporated by reference herein. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terms in the materials appended to the present disclosure and those set forth herein, the descriptions, definitions and/or use of terms in the present disclosure shall control.

Finally, it should be understood that the embodiments described in the present disclosure are intended only to illustrate the principles of the embodiments of the present disclosure. Other modifications may also fall within the scope of the present disclosure. As such, alternative configurations of embodiments of the present disclosure may be considered to be consistent with the teachings of the present disclosure as an example, not as a limitation. Correspondingly, the embodiments of the present disclosure are not limited to the embodiments expressly presented and described herein.

What is claimed is:

1. A method for monitoring welding of a smart gas pipeline based on government supervision, the method being executed based on a gas company management platform of a smart gas pipeline welding monitoring Internet of Things (IoT) system, the method comprising:

obtaining, through a gas company sensing network platform, at least one set of welding point information from a gas construction object platform, wherein each of the at least one set of welding point information corresponds to at least one welding point in a same preset pipeline region;

obtaining pipeline construction information corresponding to each of the at least one set of the welding point information from the gas construction object platform;

determining a first welding risk by looking up a first preset table based on the pipeline construction information, wherein the first welding risk includes a risk type and a risk level, and the first preset table includes a mapping relationship between the pipeline construction information and the risk type and the risk level of the first welding risk;

determining a sub-first risk value corresponding to different risk types based on the first welding risk and a historical welding risk by weighted calculation;

determining a first risk value based on the sub-first risk values corresponding to the different risk types and weights of the different risk types by weighted calculation;

in response to determining that the first risk value meets a preset condition, generating a welding adjustment instruction and sending the welding adjustment instruction to a welding personnel terminal of the gas construction object platform; and the welding personnel terminal instructing a welder to adjust a welding sequence based on the welding adjustment instruction to adjust a welding order of the at least one welding point where the first risk value is less than or equal to a preset risk threshold to last, wherein the welding sequence refers to an order of welding of welding points;

obtaining welding process information uploaded by the welding personnel terminal;

performing a preset processing on the welding process information to obtain welding key information, sending the welding key information and a welding inspection result to a smart gas government safety supervision platform, and storing the welding key information and the welding inspection result in a government supervision comprehensive database, wherein the welding key information refers to welding process information that reflects key operations of welding, and the welding key information includes welding key images, and the welding inspection result refers to a testing result of welding quality of a welding point after welding is completed;

obtaining monitoring parameters of the preset pipeline region through the smart gas government safety supervision platform, wherein the monitoring parameters refer to operating parameters of a monitoring device, and the monitoring parameters include a monitoring frequency of the monitoring device;

wherein the method includes:

obtaining point environmental information of each welding point from the gas construction object platform, generating first environmental information based on environmental information of the preset pipeline region and the point environmental information, wherein the point environmental information refers to environment-related information near the welding point, the environmental information of the preset pipeline region refers to information reflecting an overall environmental condition in the preset pipeline region, and the first environmental information refers to relevant information reflecting current environment when welding a gas pipeline;

for each welding point, determining an environmental impact factor by looking up a second preset table based on the first environmental information of the welding point, wherein the second preset table includes different first environmental impact information and corresponding impact factors; determining a first welding risk based on pipeline construction information; determining a second welding risk of the welding point as a product of the environmental impact factor and the first welding risk;

determining an early warning notification based on the second welding risk and sending the early warning notification to the gas construction object platform;

determining a focused inspection region and a general inspection region based on the second welding risk and the welding process information;

generating an inspection device plan of the focused inspection region and the general inspection region during a welding inspection phase after completing the welding;

generating at least one set of devices to be inspected and inspector information corresponding to the at least one set of devices to be inspected based on the inspection device plan;

sending the at least one set of the devices to be inspected and the inspector information to a corresponding inspector terminal in the gas construction object platform, including:

informing an inspector through the corresponding inspector terminal based on the at least one set of devices to be inspected and the inspector information corresponding to the at least one set of devices to be inspected; and performing inspection and determining the welding inspection result based on the at least one set of devices to be inspected, including:

performing, by the inspector, an air tightness inspection on the focused inspection region and the general inspection region through a gas tightness tester.

2. The method of claim 1, wherein the determining the early warning notification based on the second welding risk and sending the early warning notification to the gas construction object platform includes:

obtaining design delivery pressure;

determining a welding risk threshold for each welding point based on the design delivery pressure; and in response to determining that the second welding risk is greater than the welding risk threshold, generating the early warning notification and sending the early warning notification to the gas construction object platform.

3. The method of claim 1 wherein the method includes:

determining a pipeline hazard level of the preset pipeline region based on the welding inspection result and storing the pipeline hazard level in the government supervision comprehensive database.

4. The method of claim 1, wherein the second welding risk includes second instantaneous welding risks at a plurality of time points and a second cumulative welding risk, the method comprising:

determining the second cumulative welding risk based on the second instantaneous welding risks at the plurality of time points.

5. The method of claim 4, wherein the determining the second welding risk of the welding point includes:

obtaining the second instantaneous welding risks at the plurality of time points based on the first environmental information and the pipeline construction information through a risk prediction model, the risk prediction model being a machine learning model.

6. The method of claim 5, wherein input to the risk prediction model further includes second environmental information, and the second environmental information refers to information relating to future environment in which a pipeline will be situated in future after the pipeline is put into service.

7. The method of claim 6, wherein module training of the risk prediction model includes first training samples and second training samples, wherein the first training samples include sample pipeline construction information that satisfies a first preset condition, sample first environmental information that satisfies the first preset condition, and sample second environmental information that satisfies the first preset condition;

the second training samples include sample pipeline construction information that does not satisfy the first preset condition, sample first environmental information that does not satisfy the first preset condition, and sample second environmental information that does not satisfy the first preset condition; and first training labels corresponding to the first training samples are sample second instantaneous welding risks corresponding to each set of the first training samples, and second training labels corresponding to the second training samples are sample second instantaneous welding risks corresponding to each set of the second training samples.

8. An Internet of Things (IoT) system for monitoring welding of an smart gas pipeline based on governmental regulation, comprising: an smart gas government safety supervision platform, an smart gas government safety supervision sensing network platform, an smart gas government safety supervision object platform, a gas company sensing network platform and a gas construction object platform, wherein the smart gas government safety supervision platform includes a government supervision comprehensive database, and the smart gas government safety supervision object platform includes a gas company management platform, the gas construction object platform is configured to: obtain at least one set of welding point information and pipeline construction information corresponding to each of the at least one set of the welding point information;

the gas company management platform is configured to:

obtain, through the gas company sensing network platform, the at least one set of welding point information from the gas construction object platform, wherein each of the at least one set of welding point information corresponds to at least one welding point in a same preset pipeline region;

obtain the pipeline construction information corresponding to each of the at least one set of the welding point information from the gas construction object platform;

determine a first welding risk by looking up a first preset table based on the pipeline construction information, wherein the first welding risk includes a risk type and a risk level, and the first preset table includes a mapping relationship between the pipeline construction information and the risk type and the risk level of the first welding risk;

determine a sub-first risk value corresponding to different risk types based on the first welding risk and a historical welding risk by weighted calculation;

determining a first risk value based on the sub-first risk values corresponding to the different risk types and weights of the different risk types by weighted calculation;

in response to determining that the first risk value meets a preset condition, generate a welding adjustment instruction and send the welding adjustment instruction to a welding personnel terminal of the gas construction object platform; wherein the welding personnel terminal instructs a welder to adjust a welding sequence based on the welding adjustment instruction to adjust a welding order of the at least one welding point where the first risk value is less than or equal to a preset risk threshold to last, and the welding sequence refers to an order of welding of welding points;

obtain welding process information uploaded by the welding personnel terminal;

perform a preset processing on the welding process information to obtain welding key information, send the welding key information and a welding inspection result to the smart gas government safety supervision and management platform, and store the welding key information and the welding inspection result in the government supervision comprehensive database, wherein the welding key information refers to welding process information that reflects key operations of welding, and the welding key information includes welding key images, and the welding inspection result refers to a testing result of welding quality of a welding point after welding is completed;

obtain monitoring parameters of the preset pipeline region through the smart gas government safety supervision platform;

the smart gas government safety supervision platform is configured to: determine the monitoring parameters of the preset pipeline region, wherein the monitoring parameters refer to operating parameters of a monitoring device, and the monitoring parameters include a monitoring frequency of the monitoring device;

wherein the gas company management platform is further configured to:

obtain point environmental information of each welding point from the gas construction object platform, generate first environmental information based on environmental information of the preset pipeline region and the point environmental information, wherein the point environmental information refers to environment-related information near the welding point, the environmental information of the preset pipeline region refers to information reflecting an overall environmental condition in the preset pipeline region, and the first environmental information refers to relevant information reflecting current environment when welding a gas pipeline;

for each welding point, determine an environmental impact factor by looking up a second preset table based on the first environmental information of the welding point, wherein the second preset table includes different first environmental impact information and corresponding impact factors; determine a first welding risk based on pipeline construction information; determine a second welding risk of the welding point as a product of the environmental impact factor and the first welding risk;

determine an early warning notification based on the second welding risk and send the early warning notification to the gas construction object platform;

determine a focused inspection region and a general inspection region based on the second welding risk and the welding process information;

generate an inspection device plan of the focused inspection region and the general inspection region during a welding inspection phase after completing the welding;

generate at least one set of devices to be inspected and inspector information corresponding to the at least one set of devices to be inspected based on the inspection device plan;

send the at least one set of the devices to be inspected and the inspector information to a corresponding inspector terminal in the gas construction object platform, wherein to send the at least one set of the device to be inspected and the inspector information to a corresponding inspector terminal in the gas construction object platform, the gas company management platform is further configured to:

inform the inspector through the corresponding inspector terminal based on the at least one set of devices to be inspected and the inspector information corresponding to the at least one set of devices to be inspected; and perform inspection and determine the welding inspection result based on the at least one set of devices to be inspected, wherein to perform inspection and determine the welding inspection result based on the at least one set of devices to be inspected, the gas company management platform is further configured to:

instruct the inspector to perform an air tightness inspection on the focused inspection region and the general inspection region through a gas tightness tester.

9. The system of claim 8, wherein the gas company management platform is further configured to:

obtain design delivery pressure;

determine a welding risk threshold for each welding point based on the design delivery pressure; and in response to determining that the second welding risk is greater than the welding risk threshold, generate the early warning notification and sending the early warning notification to the gas construction object platform.

10. The system of claim 8, wherein the gas company management platform is further configured to:

determine a pipeline hazard level of the preset pipeline region based on the welding inspection result and store the pipeline hazard level in the government supervision comprehensive database.

* * * * *